(12) United States Patent
Huh

(10) Patent No.: US 8,479,336 B2
(45) Date of Patent: Jul. 9, 2013

(54) MULTI-FUNCTIONAL PRIMER AND METHOD OF MANUFACTURING SHOE USING THE SAME

(75) Inventor: Sung-Hwan Huh, Tangerang (ID)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/399,238

(22) Filed: Feb. 17, 2012

(65) Prior Publication Data

US 2012/0144604 A1 Jun. 14, 2012

Related U.S. Application Data

(63) Continuation of application No. PCT/EP2010/061717, filed on Aug. 12, 2010.

(30) Foreign Application Priority Data

Aug. 17, 2009 (KR) .................. 10-2009-0075665

(51) Int. Cl.
*A43D 63/00* (2006.01)
*C09D 175/04* (2006.01)
(52) U.S. Cl.
USPC ..................................... 12/142 RS; 524/507
(58) Field of Classification Search
USPC ..................................... 12/142 RS; 524/507
See application file for complete search history.

(56) References Cited

U.S. PATENT DOCUMENTS

| 7,910,656 B2 * | 3/2011 | Lutz et al. ............... 525/113 |
| 2005/0209401 A1 * | 9/2005 | Lutz et al. ............... 525/113 |
| 2006/0276601 A1 * | 12/2006 | Lutz et al. ............... 525/528 |
| 2008/0045670 A1 * | 2/2008 | Lutz et al. ............... 525/404 |

FOREIGN PATENT DOCUMENTS

| KR | 100191275 B1 | 6/1999 |
| KR | 20000063527 A | 11/2000 |
| WO | 9903907 A1 | 1/1999 |

* cited by examiner

*Primary Examiner* — Marie Patterson
(74) *Attorney, Agent, or Firm* — Sun Hee Lehmann

(57) ABSTRACT

The present invention provides a multifunctional primer, comprising a first solution including 15 to 55 parts by weight of natural rubber and 750 to 1350 parts by weight of an organic solvent; a second solution from 100 parts by weight of the first solution and additionally 45 to 90 parts by weight of a polyurethane-dispersion; comprising a third solution from 100 parts by weight of the second solution and 100 to 250 parts by weight of a butadiene-based rubber solution containing 50 to 200 parts by weight of a butadiene rubber and 800 to 950 parts by weight of an organic solvent. Additionally a method of manufacturing a shoe is disclosed in an environmentally friendly manner by application of the primer to a transfer sheet, this being dried and cut into appropriate pieces, and this film-type multifunctional primer applied on a non-vulcanized outersole of a shoe.

10 Claims, No Drawings

MULTI-FUNCTIONAL PRIMER AND METHOD OF MANUFACTURING SHOE USING THE SAME

CROSS-REFERENCE TO RELATED APPLICATIONS

This application is a continuation of International Patent Application No. PCT/EP2010/061717 filed Aug. 12, 2010, which claims priority to Korean Patent Application No. 10-2009-0075665 filed Aug. 17, 2009, the contents of both of which are incorporated herein by reference.

BACKGROUND OF THE INVENTION

The present invention relates to a multifunctional primer and a method of manufacturing a shoe using the same, and, more particularly, to a method of manufacturing a shoe in an environmentally friendly manner at a high rate of production using a film type multifunctional primer.

Generally, a rubber outsole is prepared by vulcanizing unvulcanized rubber which is cut into a planar or structured shape. Examples of conventional technologies related to this rubber outsole preparation method are disclosed in Korean Patent Registration No. 10-0191275 and Korean Unexamined Patent Application Publication No. 2000-0063527.

Korean Patent Registration No. 10-0191275 discloses a method of integrally forming a rubber outsole of a shoe and a polyurethane midsole, including the steps of: forming a rubber outsole such that a band-shaped projecting part having a predetermined width is provided over the entire periphery thereof and reticularly-arranged protrusions are formed on the surface thereof; heat-treating the rubber outsole such that the surface temperature thereof is about 40 to 50° C.; and spraying an undiluted polyurethane solution onto the heat-treated rubber outsole to integrally form a midsole on the rubber outsole. Further, Korean Unexamined Patent Application Publication No. 2000-0063527 discloses a shoe outsole and a method of manufacturing the same in which the outsole and midsole are simultaneously formed and attached through a single process.

As known conventionally a mold to form a rubber outsole is treated with a release agent in order to prevent the rubber outsole formed through a press process from sticking to the surface of the mold. As the release agent inhibits the rubber outsole from being attached to other adherents, it must be removed.

In these methods, as a rubber outsole of a shoe is formed using a liquid rubber primer, the rubber outsole has to be prepared before further processing by a washing and priming processes. Therefore, after the formation of the rubber outsole, in the washing process a washing machine and a washing solution are used in order to clean the rubber outsole. Thereafter in the priming process, a two-pack rubber primer including chloride powder and an organic solvent is used in order to treat the rubber outsole, and the two-pack rubber primer is directly applied on the surface of the rubber outsole through manual procedures. During this priming process, workers are required to wear their protectors for safety. Thereafter the primer is warmed up to react to form a strong bond to the rubber outsole. In order to manufacture a shoe, the rubber outsole prepared in this way is coated with an adhesive, dried, and is then attached to a variety of shoe parts such as a midsole, an insole, an upper and the like.

SUMMARY OF THE INVENTION

Therefore, the present invention has the object to replace a conventional two-pack rubber primer which was required to be used, and to manufacture a shoe at low cost by simplifying a complicated shoe manufacturing process.

Accordingly, an object of the present invention is to provide a multifunctional primer which can improve the adhesivity between a rubber outsole and an adhesive and which is not required to be washed.

Another object of the present invention is to provide a method of manufacturing a shoe using a multifunctional primer, in which the shoe can be simply and efficiently manufactured by transferring the multifunctional primer at the time of the preparation of a rubber outsole for a planar or structured shoe without performing additional washing and priming processes.

In order to accomplish the above object, an aspect of the present invention provides a multifunctional primer, being a third solution comprising 100 parts by weight of a second solution mixed with 100 to 250 parts by weight of a butadiene-based rubber solution, such butadiene-rubber solution containing 50 to 200 parts by weight of a butadiene rubber and 800 to 950 parts by weight of an organic solvent; the second solution comprising 100 parts by weight of a first solution and 45 to 90 parts by weight of a polyurethane-dispersion; and the first solution containing 15 to 55 parts by weight of natural rubber and 750 to 1350 parts by weight of an organic solvent.

In the multifunctional primer, the second solution may further contain about 10 to 20 parts by weight of surfactant.

The butadiene-based rubber may include any rubber selected from the group consisting of butadiene rubber, acrylonitrile-butadiene rubber and styrene-butadiene-styrene rubber.

Another aspect of the present invention provides a method of manufacturing a shoe using a multifunctional primer, including the steps of—coating a transfer sheet with the multifunctional primer,—attaching the transfer sheet coated with the multifunctional primer to a rubber outsole made of unvulcanized rubber—transferring the multifunctional primer to the rubber outsole—vulcanizing the unvulcanized rubber,—thermally activating the rubber outsole to which the multifunctional primer is transferred—applying an adhesive to the thermally-activated rubber outsole and then drying the rubber outsole having the adhesive applied thereon,—and attaching the rubber outsole to a variety of shoe parts such as a midsole, an insole, an upper and the like.

In the method, the transfer sheet may include any film material selected from the group consisting of silicon paper, PET film and high-density PP film.

DETAILED DESCRIPTION OF THE INVENTION

Hereinafter, preferred embodiments of the present invention will be described in detail.

As described above, the present invention provides a method of manufacturing a shoe using a multifunctional primer, whereby a multifunctional primer is transferred to a rubber outsole made of unvulcanized rubber, such layers are vulcanized and after thermal activation an adhesive is applied to the layer of the primer and thereafter attaching the rubber outsole to a variety of other shoe parts.

The multifunctional primer of the present invention is shall ensure an excellent adhesion and a compatibility between a vulcanized rubber outsole and a polyurethane adhesive which are different from each other in properties. The mixing ratio of the components of the multifunctional primer is critical to ensure that the multifunctional primer is compatible with both of the two substrate materials. Therefore, when the multifunctional primer was not mixed in the optimal ratio the adhesion between the primer layer and the substrates will deteriorate, and thus the mechanical stability of products is also deteriorated.

The multifunctional primer includes three kinds of major components, such as a natural rubber solution, a polyurethane dispersion and a butadiene-based rubber solution. They shall be mixed prior to the application to form the primer.

The natural rubber solution (hereinafter, referred to as a "first solution") includes 15 to 55 parts by weight of natural rubber and 750 to 1350 parts by weight of an organic solvent. When the amount of the natural rubber is less than 15 parts by weight, the compatibility between the multifunctional primer and the rubber outsole is deteriorated. When the amount thereof is more than 55 parts by weight, the compatibility between the multifunctional primer and the polyurethane adhesive is deteriorated. As natural rubber commercial available non vulcanized rubber types can be used. The person skilled in the art can easily select them according to their properties. As solvents, most unpolar solvents can be used, preferably such solvent which may evaporate below about 30° C. Examples of such organic solvents may include, but are not limited to, naphtha solvents, petroleum solvent and mixtures thereof. The solid content of the solution is less then 7 wt %.

The second component of the multifunctional primer includes a polyurethane dispersion. As polyurethane dispersion commercial PU dispersions can be used. They contain non self crosslinking polymers, but which contain a plurality of polar groups, like urethane groups, urea groups, OH groups, NH groups and/or carboxylic groups. The polymer is dissolved in water, either as self dispersible resin or together with surfactants. Also small amounts of additives can be incorporated in such dispersion, for example stabilizers, pH regulating substances, polar solvents, defoamers, emulsifiers and the like. The solid content of the polyurethane dispersion is about 25 to 65 wt.-% preferably 40 to 60 wt.-%.

An appropriate intermediate is obtained by mixing 100 parts by weight of the first solution with 45 to 90 parts by weight of the polyurethane dispersion, this intermediate named the "second solution". The term solution shall include liquid solutions, dispersions, emulsions and the like. When the amount of the polyurethane dispersion is less than 45 parts by weight, the adhesion between the multifunctional primer and the polyurethane adhesive is deteriorated. When the amount thereof is more than 90 parts by weight, the adhesion between the multifunctional primer and the rubber outsole is deteriorated. In another embodiment of the invention the second solution may further include 10 to 20 parts by weight of a surfactant to ensure the homogeneity between the solution and dispersion.

The butadiene rubber solution includes 50 to 200 parts by weight of a butadiene rubber and 800 to 950 parts by weight of an organic solvent. Examples of the butadiene-based rubber may include butadiene rubber, acrylonitrile-butadiene rubber, styrene-butadiene-styrene rubber, and the like. When the amount of the butadiene-based rubber is less than 50 parts by weight, adhesion between the multifunctional primer and the rubber outsole is deteriorated. When the amount thereof is more than 200 parts by weight, the adhesion between the multifunctional primer and the polyurethane adhesive is deteriorated. As solvents the same unpolar solvents as described above can be used. Examples of appropriate organic solvent are aliphatic or aromatic hydrocarbons specifically toluene, xylene, cyclohexane and the like.

Further to 100 parts by weight of the second solution 100 to 250 parts by weight of the butadiene-based rubber solution is mixed to form the liquid multifunctional primer (hereinafter, referred to as a "third solution"). When the amount of the butadiene-based rubber solution is less than 100 parts by weight, the adhesion between the multifunctional primer and the rubber outsole is deteriorated. When the amount thereof is more than 250 parts by weight, the adhesion between the multifunctional primer and the polyurethane adhesive is deteriorated. The total solid content of the primer composition is about 10 to 35 wt.-% of the whole primer.

In addition to the above mentioned polymers the primer can optionally contain small amounts of additives, like surfactants, catalyst, pigments, dyes, adhesion promoters, such additives are known and can be selected according to the general knowledge.

Another embodiment of the present invention is a method for preparing the multifunctional primer using the three major components, such as the natural rubber solution, polyurethane dispersion and butadiene-based rubber solution, which constitute the multifunctional primer.

1. Preparation of A Butadiene-Based Rubber Solution

The solute, butadiene-based rubber, is mixed with an organic solvent, and then the mixture is stirred until the solute is completely dissolved in the organic solvent 2. Preparation of A Natural Rubber Solution Natural rubber, which is a solute, is mixed with an organic solvent, and then the mixture is stirred until the solute is completely dissolved in the organic solvent.

3. Preparation of A Polyurethane Dispersion

The polyurethane is manufactured and transferred into a dispersion. Such products are commercial available. Each of the single solution or dispersion is stable and can be stored.

4. Preparation of A Multifunctional Primer

First, the prepared natural rubber solution is mixed with a polyurethane dispersion. After about 10 minutes, this mixture is slowly mixed with the prepared butadiene-based rubber solution and then stirred for about 30 minutes to prepare the multifunctional primer.

The primer shall be used and applied within 48 hours; otherwise the homogeneity of the liquid mixture becomes deteriorated.

The multifunctional primer prepared in this way may be used to attach parts made of rubber to other substrates e.g. tires, fabrics, textiles and the like, specifically a rubber outsole of a shoe.

Another embodiment of the invention is a process to bond an outer sole to other parts of a shoe. The present invention provides a method of bonding a shoe sole using a multifunctional primer, including the steps of coating a transfer sheet with the multifunctional primer, attaching the transfer sheet coated with the multifunctional primer to a rubber outsole made of unvulcanized rubber which is cut into a planar or structured shape, transferring the multifunctional primer to the rubber outsole by vulcanizing the unvulcanized rubber, thermally activating the rubber outsole to which the multifunctional primer is transferred, applying an adhesive to the thermally-activated rubber outsole and then drying the rubber outsole having the adhesive applied thereon, and attaching the rubber outsole to a variety of shoe parts.

As first step the multifunctional primer of the present invention is applied on a transfer sheet made of a releasable material. The sheet is composed of known polymers which form flexible films.

In this case, it is preferred that the multifunctional primer is applied on the transfer sheet to have a thickness of at least 0.1 mm or more, preferably less than 1 mm. The material of the transfer sheet is required to be releasable from the multifunctional primer layer as cured layer.

Examples of the transfer sheet may include all films or sheet like material, which have non-adherent properties or are covered with such coating. Preferably silicon paper, PET film, high-density PP film, and the like are used. The sheet material is selected so that it is stable against the conditions of vulcanization of rubber. The multifunctional primer may be applied on the transfer sheet using various kinds of applicators. The kind of the applicator is not particularly limited as long as the applicator enables the multifunctional primer to be applied on the transfer sheet in such a way as to be of uniform thickness.

After the application of the multifunctional primer to the transfer sheet the coated sheet can be applied directly or it is dried to evaporate major parts of solvents and/or water, so that the sheet can be stored, for example it can be rolled. The primer layer is solid so that it can be processed easily. Before application the transfer sheet is cut into pieces in about the form and size of the sole to be bonded. The sheet is cut to a size 5 to 10 mm greater than that of substrate. The substrate is the sole material preferably in an unvulcanized form. This sheet is applied to the substrate with the coated side and fixed or pressed together and is passed through a rubber sole vulcanization process as known in the art. So the multifunctional primer is completely bound and transferred to the substrate, thus forming a vulcanized rubber outsole having a firmly bound primer layer on one side. After the rubber outsole vulcanization process is completed, the sole may be removed from the mould without adhering to the mould form. Thereafter the transfer sheet may be removed from the surface of the vulcanized rubber outsole and will provide a surface covered with a non contaminated primer layer. This coated rubber outsole can be stored before processing. The primer layer does not loose its adhesive properties even if it is stored under normal environmental conditions for more than one month. To maintain the clean surface it is preferred to store the sole covered with a protection film, for example the transfer sheet.

For further processing the coated vulcanized rubber outsole may be thermally activated under conventional conditions (for example, at 45 to 55° C. for 90 to 120 seconds), coated with an adhesive, dried, and then attached to a variety of shoe parts such as a midsole, an insole, an upper and the like to manufacture a shoe. No additional preparation or cleaning process of the outer sole is required.

The multifunctional primer according to the invention provides a coating layer which shows excellent adhesion to a rubber surface and an adhesive. The primer can be stored as coated layer on the transfer sheet or bonded to the surface of the rubber substrate. This allows an advantageous handling of the primer.

The process according to the invention provides a precursor material in the shoe manufacturing industry, whereby the removal from the molding form of the sole is simplified. Additionally no further cleaning or preparation step is necessary on the sole substrate before bonding the other parts of the shoe together. The application of the primer to the transfer sheet, cutting to an appropriate size and the application in the vulcanizing form can be handled automatically, if required. This reduces the exposure of personnel to potentially harmful substances in the manufacturing process.

Hereinafter, the present invention will be described in more detail through the following Examples. However, the scope of the present invention is not limited thereto.

EXAMPLE 1

1. Preparation of the Butadiene-Based Rubber Solution 150 parts of butadiene-based rubber (UBE150, manufactured by UBE Industries Ltd.), which was a solute, was mixed with 150 parts by weight of toluene, and then the mixture was stirred until the solute was completely dissolved in the toluene.

2. Preparation of A Natural Rubber Solution 40 parts by weight of natural rubber (SIR3L, manufactured by Asia Rubber Industries Ltd.), which was a solute, was mixed with a mixed solvent including 560 parts by weight of a naphtha solvent (Honasol), 240 parts by weight of cyclohexane and 160 parts by weight of a petroleum-based solvent (HS-120), and then the mixture was stirred until the solute was completely dissolved in the mixed solvent.

3. Preparation of A Multifunctional Primer 495 parts by weight of a natural rubber solution, 495 parts by weight of a polyurethane dispersion (U-54, manufactured by Bayer Industries Ltd.) and 10 parts by weight of a surfactant (OP-1050) were mixed. After about 10 minutes, 333 parts by weight of this mixture was slowly mixed with 333 parts by weight of the prepared butadiene-based rubber solution, and then stirred for about 30 minutes to prepare a multifunctional primer.

EXAMPLE 2

The multifunctional primer prepared in Example 1 was applied on silicon paper, serving as a transfer sheet, to have a thickness of about 0.1 mm using a bar coating method, and then the silicon paper coated with the multifunctional primer was adhered to the surface of unvulcanized rubber (adherent), and then a rubber vulcanization process was performed under the conditions of 160° C., 115 kg/cm2 and 420 seconds.

The vulcanized rubber outsole, to which the multifunctional primer was transferred, was thermally activated in a heating chamber at a temperature of 45 to 55° C. for about 100 seconds, coated with an adhesive (AQUACE W-01, aqueous, commercially available from PT. Dongsung NSC), and was then thermally dried at a temperature of 55 to 65° C. for about 100 seconds. Thereafter, the thermally-dried rubber outsole was manually attached to a midsole and an upper and then further attached using a hydraulic walled sole attaching machine to manufacture a shoe.

COMPARATIVE EXAMPLE 1

In order to compare the method of manufacturing a show using the multifunctional primer of Example 1 with a conventional shoe manufacturing method, the conventional shoe manufacturing method was conducted as follows.

After a release agent was applied on the inner surface of a mold for molding unvulcanized rubber, unvulcanized rubber was charged in the mold, and was then formed into a vulcanized rubber outsole through a rubber vulcanization process under the vulcanizing conditions of 160° C., 115 kg/cm2 and 420 seconds. Subsequently, the vulcanized rubber outsole was washed using a washing machine provided with three different kinds of detergents and having a diameter of 15 to 20 m, and then thermally dried.

Then, the thermally-dried rubber outsole was manually coated with a previously-prepared two-pack rubber primer (AQUACE PR-505, aqueous, commercially available from PT. Dongsung NSC). The two-pack rubber primer was prepared by mixing a powdered solute in a solvent, and was used after the powdered solute was completely dissolved in the solvent. During this priming process, the workers using the two-pack rubber primer are required to wear their protectors for safety. Subsequently, the rubber outsole coated with the two-pack rubber primer was further thermally dried completely.

Thereafter, the completely dried rubber outsole was coated with an adhesive (AQUQCE W-01, aqueous, commercially available from PT. Dongsung NSC), and was then thermally dried at a temperature of 55 to 65° C. for about 170 seconds. Then, the thermally-dried rubber outsole was manually attached to a midsole and an upper and then further attached using a hydraulic walled sole attaching machine to manufacture a shoe.

EXPERIMENTAL EXAMPLE

The rubber outsole was attached to an upper and a midsole using the multifunctional primer of Example 1. After 24 hours, a peeling test was conducted using a tension machine (INSTRON 4443) to measure the adhesivity between the rubber outsole and the upper and between the rubber outsole and the midsole. In addition, the measurement of the adhesivity therebetween was conducted using the test sample obtained from Comparative Example 1. The results thereof are given in Table 1.

TABLE 1

| Class. | | Example 1 | Comparative Example 1 |
|---|---|---|---|
| Adhesivity1) (kg/cm) | adhesivity between rubber outsole and upper | 4.0-6.0 (upper is damaged) | 3.5-5.5 (upper is damaged) |
| | adhesivity between rubber outsole and midsole | 4.0-6.0 | 3.5-5.5 |

As given in Table 1, it can be seen that the test example using the multifunctional primer according to the present invention has adhesivity equal to or greater than the conventional test sample (Comparative Example 1)

As described above, the method of manufacturing a shoe according to the present invention, compared to conventional shoe manufacturing methods, is advantageous in that processes of washing and priming a rubber outsole need not be conducted, thus improving productivity. Further, the method of manufacturing a shoe according to the present invention is advantageous in that production costs can be reduced by decreasing the number of workers and facilities due to the omission of the washing and priming processes and in that a shoe can be manufactured in an manner friendly to the environment due to the omission of the washing process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A multifunctional primer, being a third solution comprising
    100 parts by weight of a second solution mixed with 100 to 250 parts by weight of a butadiene-based rubber solution, said butadiene-rubber solution containing 50 to 200 parts by weight of a butadiene rubber and 800 to 950 parts by weight of an organic solvent;
    the second solution comprising 100 parts by weight of a first solution and 45 to 90 parts by weight of a polyurethane-dispersion; and
    the first solution comprising 15 to 55 parts by weight of natural rubber and 750 to 1350 parts by weight of an organic solvent.

2. The multifunctional primer according to claim 1, wherein the second solution further comprises 10 to 20 parts by weight of a surfactant.

3. The multifunctional primer according to claim 1, wherein the butadiene-based rubber is selected from the group consisting of butadiene rubber, acrylonitrile-butadiene rubber and styrene-butadiene-styrene rubber.

4. A primer layer applied on sheet of a non-adherent material, wherein the layer being manufactured from a multifunctional primer according to claim 1.

5. A primer layer according to claim 4 wherein the layer is solid.

6. A primer layer according to claim 5 wherein the layer is coated on a flexible transfer sheet.

7. A method of manufacturing a shoe using a multifunctional primer, comprising the steps of:
    coating a transfer sheet with the primer of claim 1;
    attaching the transfer sheet coated with the primer to a rubber outsole made of unvulcanized rubber;
    bonding the multifunctional primer layer to the rubber outsole by vulcanizing the bonded substrates;
    removing the transfer sheet;
    thermally activating the rubber outsole and the primer layer;
    applying an adhesive to the primer layer and then drying the rubber outsole; and
    attaching the rubber outsole to a variety of shoe parts such as a midsole, an insole, an upper and the like.

8. The method of manufacturing a shoe using a multifunctional primer according to claim 7, wherein the transfer sheet includes any one selected from the group consisting of silicon paper, PET film and high-density PP film.

9. The method according to claim 7, wherein the coated transfer sheet is dried and storable.

10. The method according to claim 7, wherein the bonding of the outsole and the shoe parts is assisted by pressure and/or heat.

* * * * *